United States Patent
Park et al.

(10) Patent No.: US 9,907,066 B2
(45) Date of Patent: Feb. 27, 2018

(54) METHOD FOR RECEIVING DISCOVERY REFERENCE SIGNAL BY TERMINAL IN WIRELESS COMMUNICATION SYSTEM AND DEVICE THEREFOR

(71) Applicant: LG Electronics Inc., Seoul (KR)

(72) Inventors: Jonghyun Park, Seoul (KR); Yunjung Yi, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 15/021,528

(22) PCT Filed: Feb. 4, 2015

(86) PCT No.: PCT/KR2015/001147
§ 371 (c)(1),
(2) Date: Mar. 11, 2016

(87) PCT Pub. No.: WO2015/133737
PCT Pub. Date: Sep. 11, 2015

(65) Prior Publication Data
US 2016/0227526 A1    Aug. 4, 2016

Related U.S. Application Data

(60) Provisional application No. 61/949,263, filed on Mar. 7, 2014, provisional application No. 61/950,807, filed on Mar. 10, 2014.

(51) Int. Cl.
*H04W 4/00*    (2009.01)
*H04W 72/04*    (2009.01)
(Continued)

(52) U.S. Cl.
CPC ......... *H04W 72/042* (2013.01); *H04L 5/0048* (2013.01); *H04L 5/0094* (2013.01);
(Continued)

(58) Field of Classification Search
CPC ........... H04W 72/042; H04W 72/0453; H04W 48/16; H04W 72/0446; H04W 16/32; H04L 5/0048; H04L 5/0094; H04L 5/0023
See application file for complete search history.

(56) References Cited

U.S. PATENT DOCUMENTS

2012/0147773 A1    6/2012 Kim et al.
2012/0322477 A1    12/2012 Kang et al.
(Continued)

FOREIGN PATENT DOCUMENTS

CN    101583080 A    11/2009

OTHER PUBLICATIONS

Mediatek Inc.: "Performance evaluation for small cell discovery using legacy reference signals", R1-131684, 3GPP TSG-RAN WG1 Meeting #72bis, Chicago, USA, Apr. 15-19, 2013.
(Continued)

*Primary Examiner* — Afshawn Towfighi
(74) *Attorney, Agent, or Firm* — Dentons US LLP

(57) ABSTRACT

Disclosed in the present invention is a method for receiving a discovery reference signal by a terminal in a wireless communication system. Particularly, the method comprises the steps of receiving discovery reference signal configuration information through an upper layer; blind-detecting at least one discovery reference signal on the basis of the configuration information; and transmitting/receiving a signal to/from a small cell corresponding to the detected at least one discovery signal and a serving cell, wherein the discovery reference signal configuration information includes information on a candidate parameter set of the discovery reference signal.

12 Claims, 11 Drawing Sheets

(51) Int. Cl.
*H04W 16/32* (2009.01)
*H04W 48/16* (2009.01)
*H04L 5/00* (2006.01)

(52) U.S. Cl.
CPC .......... H04W 16/32 (2013.01); H04W 48/16 (2013.01); H04W 72/0446 (2013.01); H04W 72/0453 (2013.01); *H04L 5/0023* (2013.01)

(56) References Cited

U.S. PATENT DOCUMENTS

2013/0157656 A1    6/2013  Gao et al.
2015/0372778 A1*  12/2015  Xu .......................... H04J 11/005
                                                   370/329

OTHER PUBLICATIONS

Mediatek Inc.: "Performance Evaluation for Small Cell Discovery Using New Schemes Based on CRS", R1-133836, 3GPP TSG-RAN WG1 Meeting #74, Barcelona, Spain, Aug. 19-23, 2013.
Qualcomm Inc.: "Reference Signal Design for Discovery", R1-135324, 3GPP TSG-RAN WG1 Meeting #75, San Francisco, USA, Nov. 11-15, 2013.
ZTE: "Design Details of Discovery Signal", R1-140272, 3GPP TSG-RAN WG1 Meeting #76, Prague, Czech Republic, Feb. 10-14, 2014.
R1-133828: 3GPP TSG-RAN WG 1#74, Barcelona, Spain, Aug. 19-23, 2013, Samsung, "Discussion on small cell discovery".
R1-140039: GPP TSG RAN WG1 Meeting #76, Prague, Czech Republic, Feb. 10-14, 2014, Huawei, HiSilicon, "Discovery design Option," XP050735606, Sec. 2, Figure 1, Sec. 3.8, Sec. 4.

* cited by examiner

FIG. 2
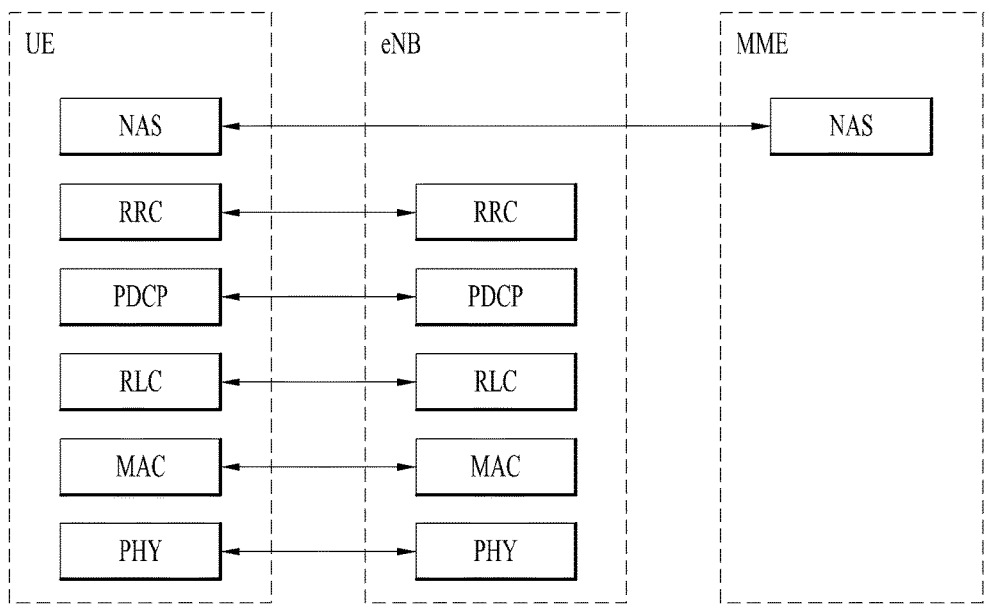
(a) Control-Plane Protocol Stack
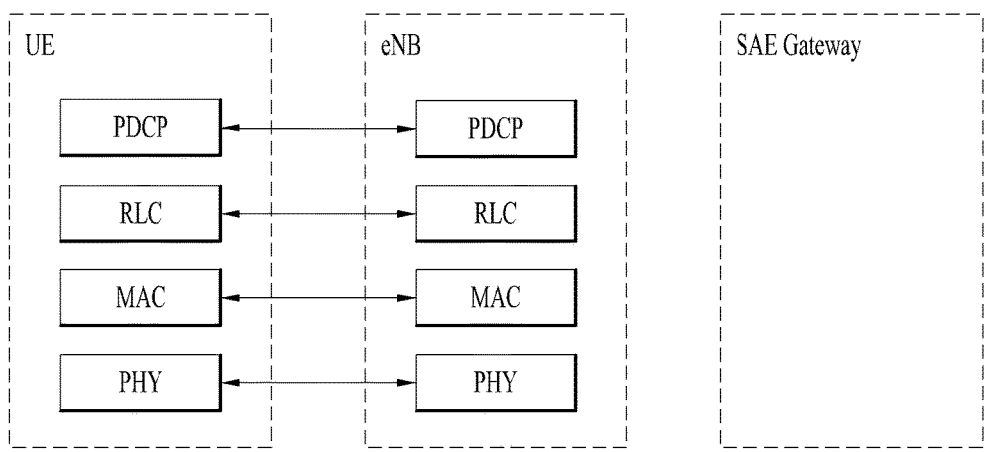
(b) User-Plane Protocol Stack

FIG. 9
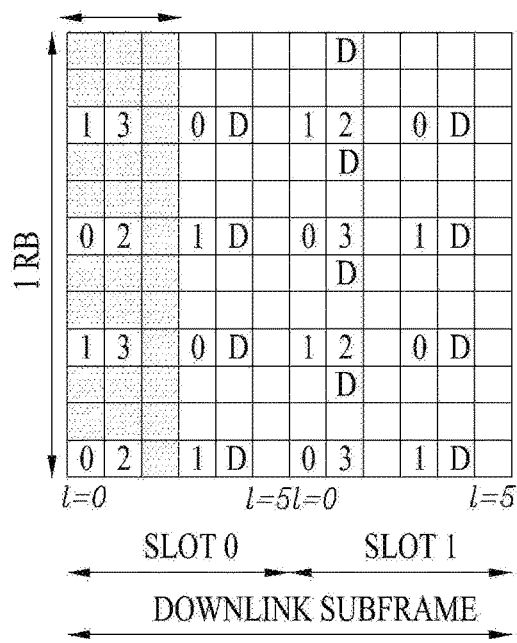
FIG. 10
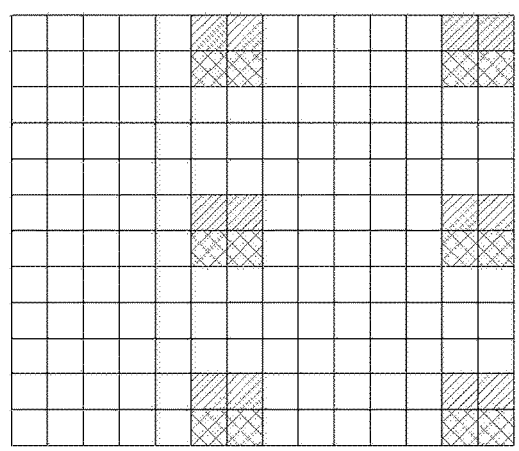
 : DMRS GROUP 1
: DMRS GROUP 2

FIG. 12

```
- - ASN1START

CSI-RS-ConfigNZP-r11 ::=        SEQUENCE {
    csi-RS-ConfigNZPId-r11          CSI-RS-ConfigNZPId-r11,
    antennaPortsCount-r11           ENUMERATED { an1, an2, an4, an8 },
    resourceConfig-r11              INTEGER ( 0 .. 31 ),
    subframeConfig-r11              INTEGER ( 0 .. 154 ),
    scramblingIdentity-r11          INTEGER ( 0 .. 503 ),
    qcl-CRS-Info-r11                SEQUENCE {
        qcl-ScramblingIdentity-r11      INTEGER ( 0 .. 503 ),
        crs-PortsCount-r11              ENUMERATED { n1, n2, n4, spare1 },
        mbsfn-SubframeConfigList-r11    CHOICE {
            release                         NULL,
            setup                           SEQUENCE {
                subframeConfigList              MBSFN-SubframeConfigList
            }
        }                                                   OPTIONAL  - - Need on
    }                                                       OPTIONAL, - - Need OR
    ...
}

- - ASN1START
```

FIG. 13

```
- - ASN1START

DRS-CSI-RS-Config-r1x ::=       SEQUENCE {
    DRS-csi-RS-ConfigId-r1x         DRS-CSI-RS-ConfigId-r1x,    ← ( Optional, per small-cell
cluster)
    antennaPortsCount-r1x           ENUMERATED { an1, an2, an4, an8 },  ← Number are examples.
    resourceConfigList-r1x          BIT STRING (SIZE (16) ),            ←The Number is an
example.
    subframeConfig-r1x              INTEGER ( 0 .. 154 ),
    scramblingIdentityList-r1x      BIT STRING (SIZE (yy) ),    ←E.g., SET OF INTEGERS
( 0 .. 503 )
    ...
}

- - ASN1START
```

METHOD FOR RECEIVING DISCOVERY REFERENCE SIGNAL BY TERMINAL IN WIRELESS COMMUNICATION SYSTEM AND DEVICE THEREFOR

This application is a 35 USC § 371 National Stage entry of International Application No. PCT/KR2015/001147 filed on Feb. 4, 2015, and claims priority to U.S. Provisional Application Nos. 61/949,263 filed on Mar. 7, 2014 and 61/950,807 filed on Mar. 10, 2014, all of which are hereby incorporated by reference in their entireties as if fully set forth herein.

TECHNICAL FIELD

The present invention relates to a wireless communication system, and more particularly, to a method for receiving a discovery reference signal in a user equipment of a wireless communication system and a device therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, an object of the present invention is to provide a method for receiving a discovery reference signal in a user equipment of a wireless communication system and a device therefor.

Technical Solution

According to one embodiment of the present invention, a method for receiving a discovery reference signal in a user equipment of a wireless communication system comprises the steps of receiving discovery reference signal configuration information through an upper layer; blind-detecting at least one discovery reference signal on the basis of the configuration information; and transmitting and receiving a signal to and from a small cell corresponding to the detected at least one discovery signal and a serving cell, wherein the discovery reference signal configuration information includes information on a candidate parameter set of the discovery reference signal.

According to another embodiment of the present invention, a user equipment in a wireless communication system comprises a wireless communication module for transmitting and receiving a signal to and from a network; and a processor for processing the signal, wherein the processor blind-detects at least one discovery reference signal on the basis of discovery reference signal configuration information provided through an upper layer and controls the wireless communication module to transmit and receive a signal to and from a small cell corresponding to the detected at least one discovery signal and a serving cell, and the discovery reference signal configuration information includes information on a candidate parameter set of the discovery reference signal.

In the embodiments of the present invention, the candidate parameter set includes one antenna port index for blind detection of the discovery reference signal, frequency resource position information that may be detected by the discovery reference signal, time resource position information that may be detected by the discovery reference signal, and a set of scrambling sequence initial values for blind detection of the discovery reference signal.

Preferably, the frequency resource position information is expressed by a set of various kinds of resource position information corresponding to the antenna port index.

More preferably, the discovery reference signal is continuously transmitted from the small cell for a specific time resource to a plurality of time resources. In this case, the time resource position information includes information on the specific time resource and information on the plurality of time resources. Particularly, the information on the specific time resource may indicate an offset value with a system frame number of the serving cell.

Additionally, blind-detection of at least one discovery reference signal may be performed on the assumption that there is no legacy reference signal in a resource where the discovery reference signal is blind-detected.

Also, in the embodiments of the present invention, time/frequency synchronization with the small cell is acquired on the basis of the discovery reference signal.

Advantageous Effects

According to the embodiment of the present invention, a user equipment can efficiently receive a discovery reference signal in a wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification.

FIG. 8 and FIG. 9 are diagrams of a structure of a reference signal in LTE system supportive of downlink transmission using 4 antennas.

FIG. 10 is a diagram for an example of assigning a downlink DM-RS defined by a current 3GPP standard document.

FIG. 12 is a diagram illustrating a configuration of a conventional NZP CSI-RS signaled to an RRC layer.

FIG. 13 is a diagram illustrating a configuration of a DRS-CSI-RS according to the embodiment of the present invention.

BEST MODE FOR CARRYING OUT THE INVENTION

Figure 1:
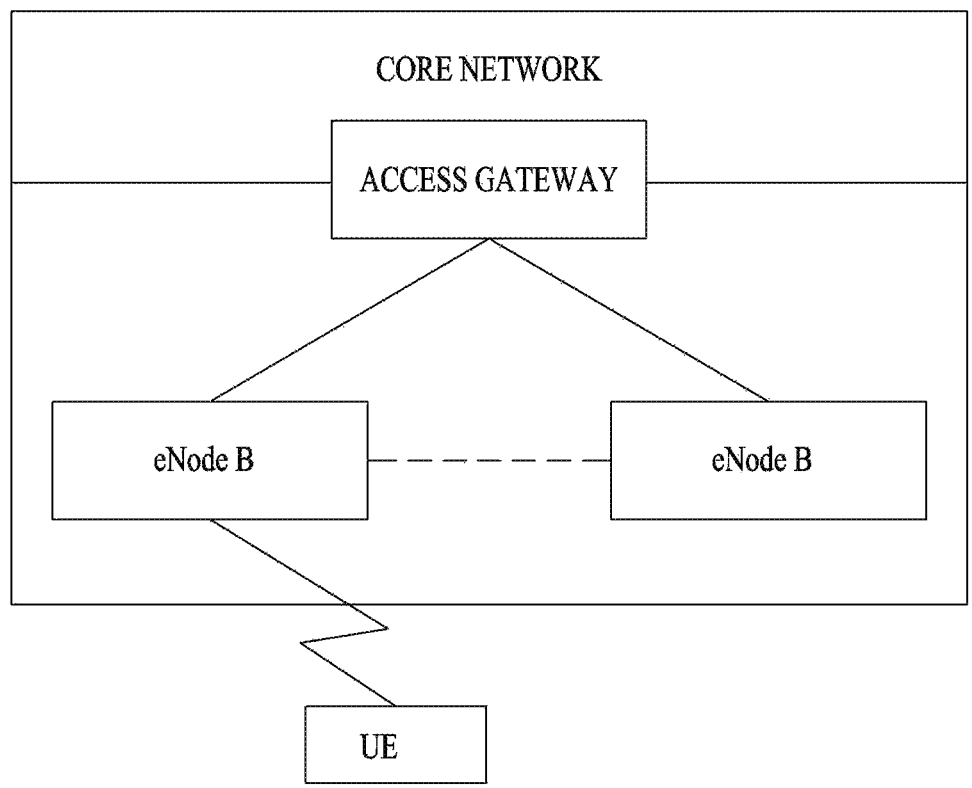
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
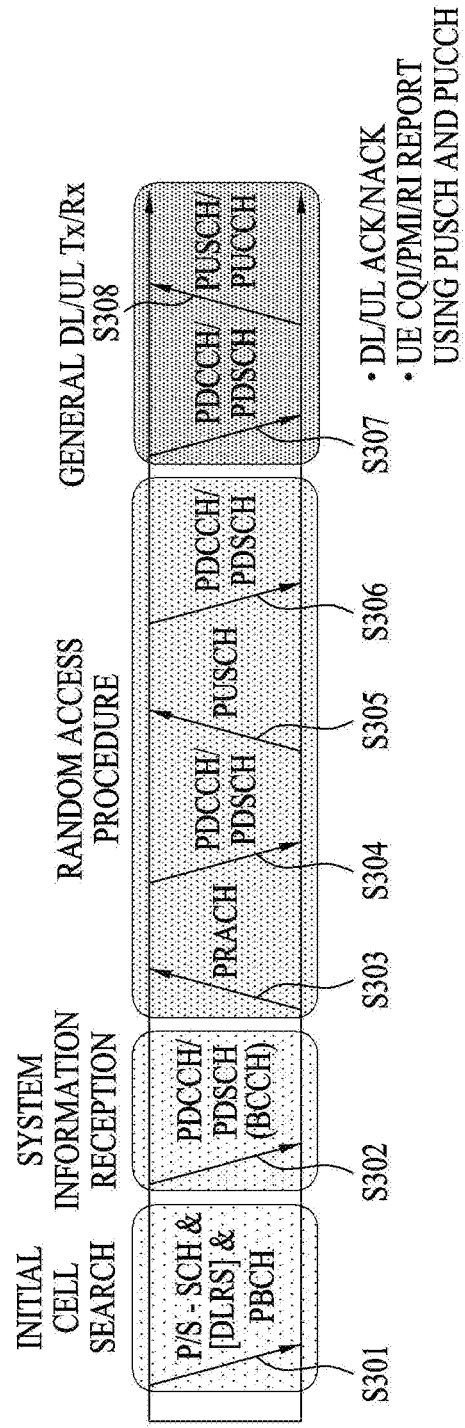
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like.

In the 3GPP LTE system, the UE may transmit the control information such as CQI/PMI/RI through a PUSCH and/or a PUCCH.

Figure 4:
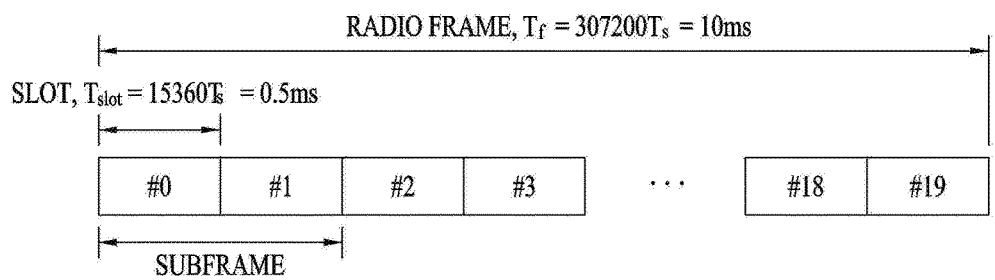
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360\ T_s$). In this case, $T_s$ denotes a sampling time represented by $T_s=1/(15\ \text{kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
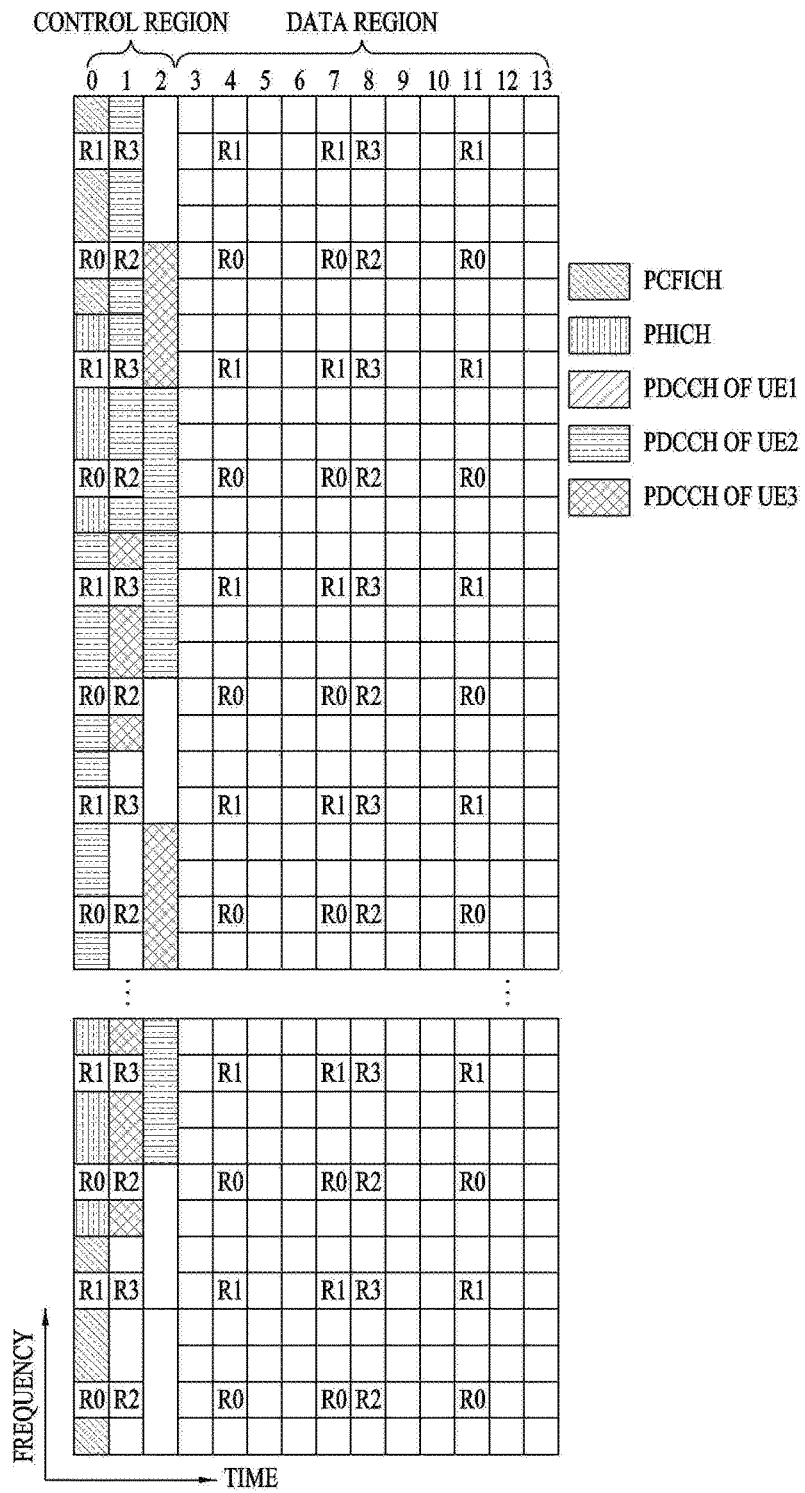
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
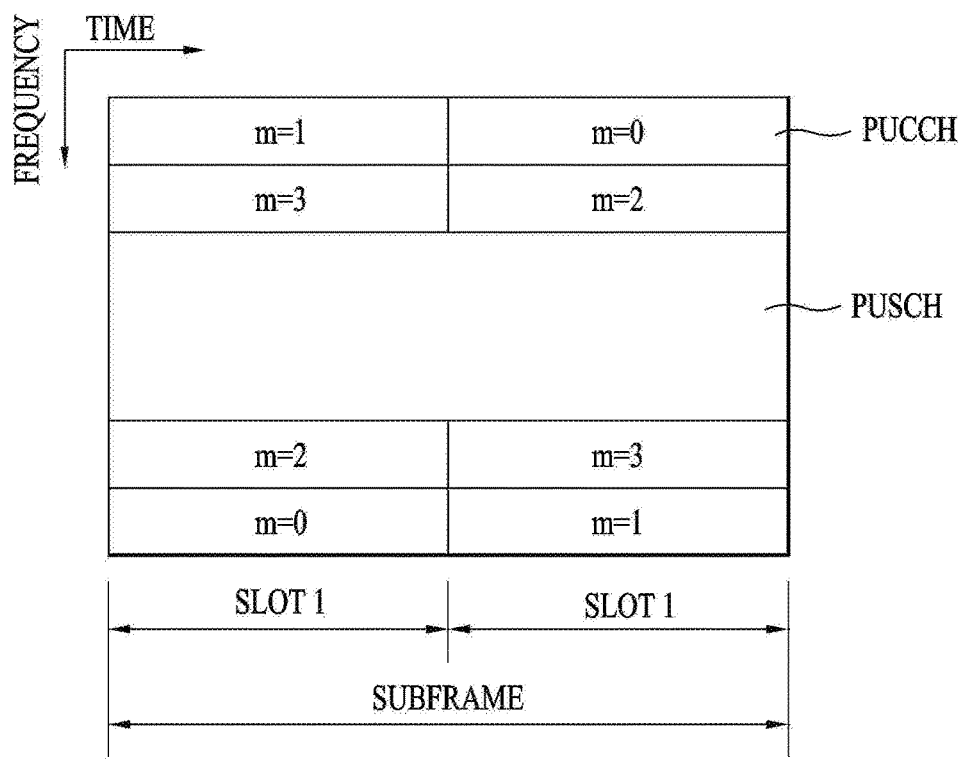
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
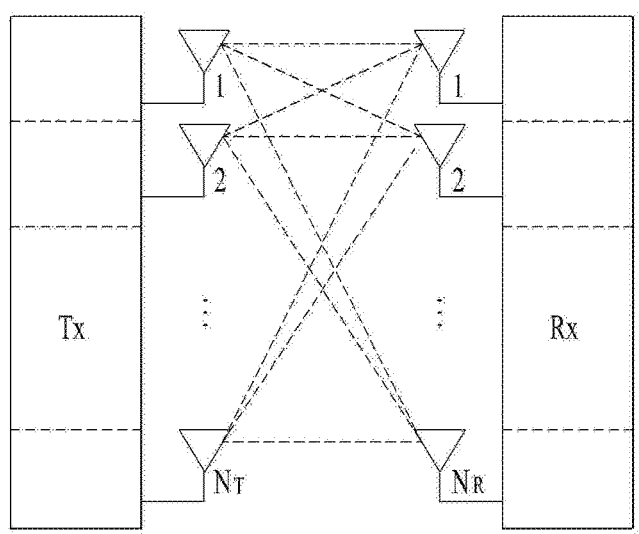
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$S = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vectors $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

rank(H)≤min($N_T$,$N_R$)  [Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by # of streams≤rank(H)≤min($N_T$,$N_R$)  [Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
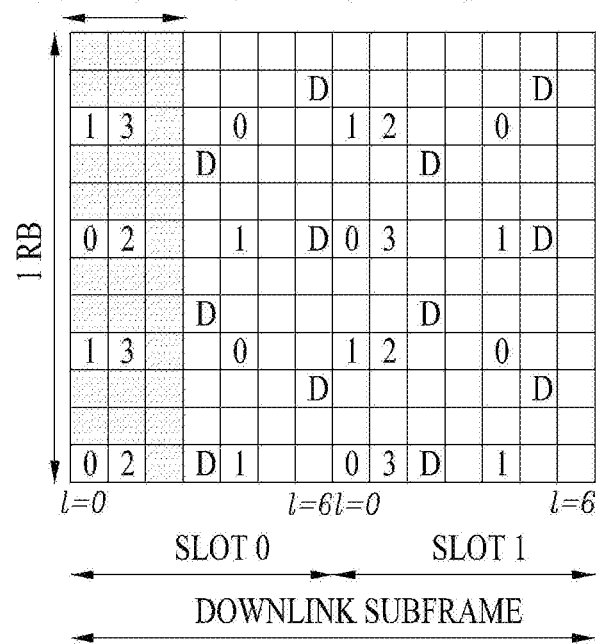

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
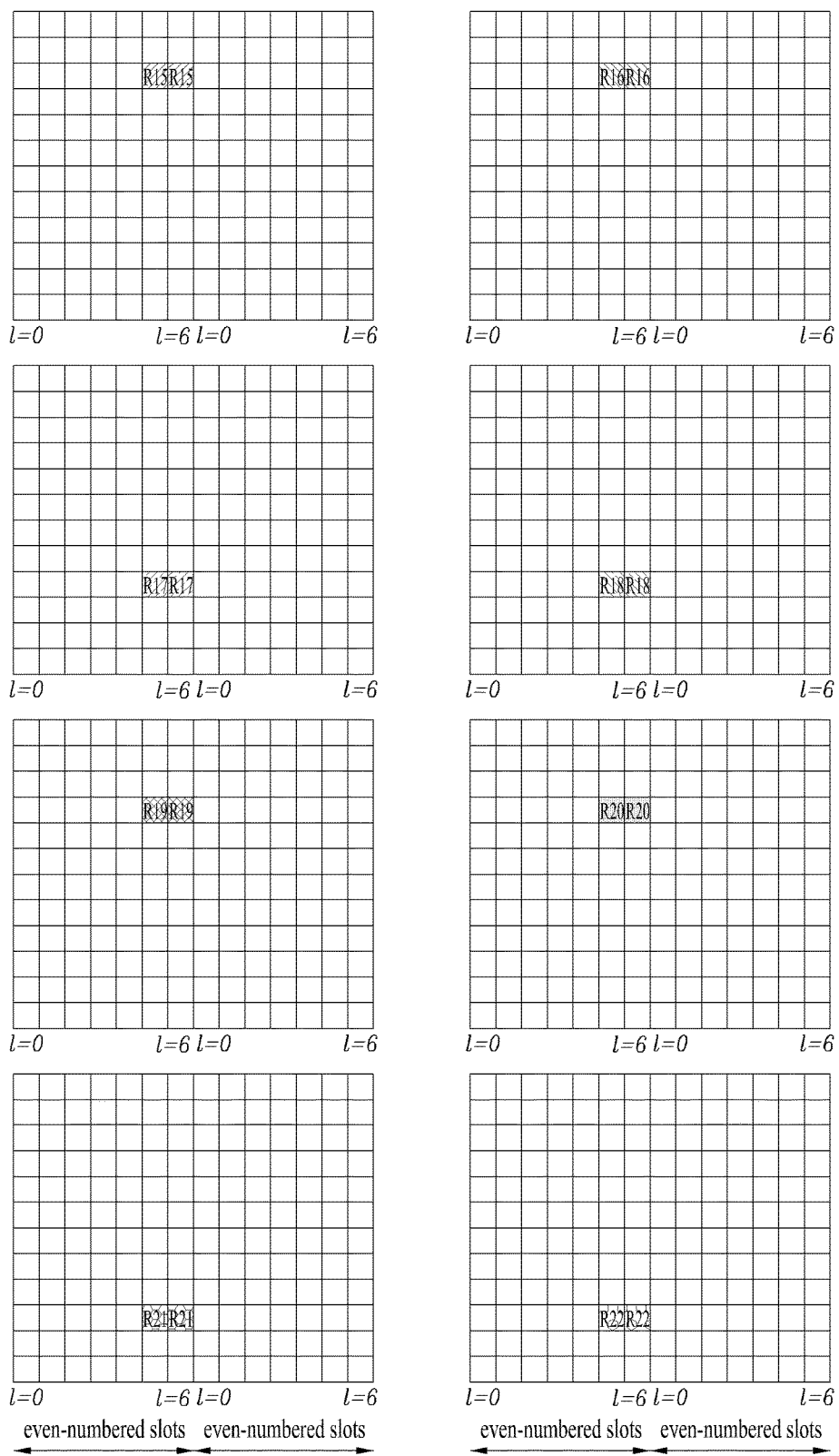
FIG. 11 is a diagram for an example of a CSI-RS configuration #0 in case of a normal CP among downlink CSI-RS configurations defined by a current 3GPP standard document.

In [Table 1] and [Table 2], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. A normal CSI-RS not the ZP CSI-RS will be referred to as a NZP (Non zero-power) CSI-RS.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

Hereinafter, the synchronization signals will be described.

The UE performs an initial cell search procedure such as acquisition of time and frequency synchronization with a cell and detection of physical layer cell identity $N^{cell}_{ID}$ of the cell when it desires to newly enter the cell or its power is turned on. To this end, the UE synchronizes with the eNB by receiving synchronization signals, for example, a primary synchronization signal (PSS) and a secondary synchronization signal (SSS) from the eNB, and acquires information such as cell ID, etc.

In more detail, a Zadoff-Chu (ZC) sequence of a length of 63 is defined in a frequency domain in accordance with the following Equation 8 and used as PSS d(n), whereby the PSS may acquire time domain synchronization and/or frequency domain synchronization such as OFDM symbol synchronization and slot synchronization.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 8]}$$

In the above Equation 8, u indicates a ZC root sequence index, and is defined in the current LTE system as illustrated in Table 4 below.

TABLE 4

| $N_{ID}^{(2)}$ | Root index u |
|---|---|
| 0 | 25 |
| 1 | 29 |
| 2 | 34 |

Next, the SSS is used to acquire frame synchronization, cell group ID and/or CP configuration (that is usage information of normal CP or extended CP) of the cell, and is configured by interleaving combination of two binary sequences of a length of 31. That is, SSS sequences are d(0), . . . , d(61), and have a total length of 62. Also, the SSS sequences are defined differently from each other depending on whether the SSS sequences are transmitted in subframe #0 or subframe #5 as expressed by the following Equation 9. However, in the Equation 9, n is an integer between 0 and 30.

$$d(2n) = \begin{cases} s_0^{(m_0)}(n)c_0(n) & \text{in subframe } 0 \\ s_1^{(m_1)}(n)c_0(n) & \text{in subframe } 5 \end{cases} \quad \text{[Equation 9]}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

In more detail, the synchronization signals are transmitted from the first slot of the subframe #0 and the first slot of the subframe #5 in consideration of a global system for mobile communication (GSM) frame length of 4.6 ms for facilitation of inter-radio access technology (inter-RAT) measurement. Especially, the PSS is transmitted from the last OFDM symbol of the first slot of the subframe #0 and from the last OFDM symbol of the first slot of the subframe #5, and the SSS is transmitted from the second to last OFDM symbol of the first slot of the subframe #0 and from the second to last OFDM symbol of the first slot of the subframe #5. A boundary of a corresponding radio frame may be detected through the SSS. The PSS is transmitted from the last OFDM symbol of a corresponding slot and the SSS is transmitted from an OFDM symbol immediately before the OFDM symbol from which the PSS is transmitted.

An SS may represent a total of 504 unique physical layer cell IDs through a combination of 3 PSSs and 168 SSSs. In other words, the physical layer cell IDs are grouped into 168 physical layer cell ID groups, each of which includes three unique IDs so that each physical layer cell ID is a part of only one physical layer cell ID group. Accordingly, a physical layer cell ID NcellID is uniquely defined by number N(1)ID in the range of 0 to 167 indicating a physical layer cell ID group and number N(2)ID from 0 to 2 indicating the physical layer ID in the physical layer cell ID group. The UE may be aware of one of three unique physical layer IDs by detecting the PSS, and may be aware of one of 168 physical layer cell IDs associated with the physical layer ID by detecting the SSS.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID. Afterwards, the UE may receive intra-cell broadcast information managed by the eNB on a PBCH.

Meanwhile, in an environment that small cells are arranged densely, the UE may be connected to be overlapped with a macro cell and the small cells, and may perform data offloading. Under the circumstances, it is preferable that the UE distributively receives data and another information together with the macro cell by discovering one or more cells within a communication range. That is, an optimized cell for data offloading is not the optimized cell in view of RSRP (Reference Signal Received Power)/RSRQ (Reference Signal Received Quality). Preferably, a cell which has low load or is connected with many users may be an optimized cell for data offloading in view of entire cell management. The present invention suggests a procedure of transmitting a discovery reference signal (DRS) to detect more cells than a conventional cell detection method.

The DRS suggested in the present invention should (1) detect more cells than the legacy PSS/SSS/CRS based cell detection scheme, (2) detect and measure cells in a short time such as a subframe unit, and (3) support necessary measurement for fast time scale on/off operation. To this end, the present invention considers a structure of the DRS as candidates as follows:

[1] PSS/(SSS)+CRS;
[2] PSS/(SSS)+CSI-RS;
[3] PSS/(SSS)+PRS; and
[4] combination of one or more options of [1]-[3]

Additionally, it is expected that the DRS should be used for coarse time/frequency tracking, measurement of QCL (quasi co-location), etc., and should meet the following requirements.

1) The DRS should support coarse time synchronization with assumption of a very high initial timing error (error of about 2.5 ms).

2) The DRS should support coarse frequency synchronization with assumption of a very high initial frequency error (error of about 20 Khz)

3) The DRS should support the detectability of at least three cells or transmission points.

4) Finally, the DRS should support sufficient accuracy of measurement.

Hereinafter, to support the requirements of (1) and (2), it is assumed that PSS and/or SSS can be transmitted as the DRS.

Also, the periodicity of the DRS should be considered with the following constraints:

(a) multiple of measurement gap period: 40 msec, 80 msec, or 160 msec or 320 msec (if a new measurement gap period is defined, multiple of those new periods can be considered);

(b) alignment with DRX cycle: 10, 20, 32, 40, 64, 80, 128, 160, 256, 320, 512, 640, 1024, 1280, 2048, 2560 [subframe unit] (this constraint may not be considered if a UE uses legacy signals for the serving cell); and (c) if PSS/SSS are transmitted as the DRS, the periodicity of the DRS may be multiple of 5 msec so that PSS/SSS transmitted as the DRS can be replaced by PSS/SSS transmitted in on-state, that is, legacy PSS/SSS. If the PSS/SSS transmitted in on-state does not exist, this constraint may not be considered. Or to avoid impact on the legacy UE, PSS/SSS transmitted in on-state and PSS/SSS transmitted as the DRS may be transmitted with different periodicities not aligned with each other. That is, additional PSS/SSS can be transmitted as the DRS. If additional PSS/SSS are transmitted as the DRS, the additional PSS/SSS can be identified from the legacy PSS/SSS by cell ID.

Hereinafter, the present invention will be described based on PSS/(SSS)+CSI-RS of the DRS candidates of the above [1] to [4]. However, this is intended for convenience of description, and the present invention may similarly be extended to the other DRS candidates.

If a DRS, which will be transmitted from a specific cell in a long-term, is configured in the form of {DRS-PSS, DRS-SSS, DRS-CSI-RS}, sequences and resources of the DRS-PSS and the DRS-SSS are configured similarly to those of the legacy PSS and SSS, if possible, but may be transmitted using different sequence scrambling initialization parameters and/or resource positions (for example, different time/frequency resources). That is, waveforms of the DRS-PSS and DRS-SSS may be configured to be the same as those of the legacy PSS/SSS.

Also, the DRS-CSI-RS may first be considered to be designed, if possible, similarly to the configuration of the legacy NZP CSI-RS. In particular, a waveform of the DRS-CSI-RS may be configured to be the same as that of the legacy NZP CSI-RS. FIG. 12 illustrates a configuration of the legacy NZP CSI-RS signaled to RRC layer.

However, unlike that a timing when a corresponding CSI-RS indicated explicitly by a specific csi-RS-ConfigNZPId-r11 is transmitted, a resource position and sequence scrambling parameters are UE-specifically provided to the UE through RRC signaling like the legacy NZP CSI-RS configuration illustrated in FIG. 12, since a plurality of unspecified small cells are entities for DRS-CSI-RS transmission, in case of the DRS-CSI-RS, the UE should directly perform blind detection for the presence of the DRS-CSI-RS transmitted from a specific cell. Therefore, it is preferable that candidate sets (for example, sequence scrambling initialization parameters, potential time/frequency resource positions, the number of antenna ports, possible QCL assumption with other reference signals, etc.) for blind detection not explicit configuration may be signaled through RRC layer.

FIG. 13 is a diagram illustrating a configuration of a DRS-CSI-RS according to the embodiment of the present invention.

After the DRS-CSI-RS configuration of FIG. 13 is provided to the UE through RRC signaling, the UE may be operated to perform blind detection for the DRS-CSI-RS transmitted from a specific cell in accordance with such a configuration and perform measurement (for example, RRM (Radio Resource Management) measurement such as RSRP, RSRQ, and RSSI (Received Signal Strength Indicator) and CSI (Channel Status Information) measurement) in accordance with a previously defined procedure. Hereinafter, the DRS-CSI-RS configuration illustrated in FIG. 13 will be described in more detail with reference to (A) to (E).

(A) ID (for example, 1, 2, . . . , maxDRS-csi-RS-ConfigId) may be given in the form of DRS-csi-RS-ConfigId-r1x, and a maximum number (maxDRS-csi-RS-ConfigId) of IDs may be configured separately. At this time, each ID may mean ID representative of a small cluster set, and small cells dependent upon such ID commonly follows a part of the following configurations, wherein cell-specific information such as scrambling ID is applied to each cell, whereby the DRS-CSI-RS may be transmitted.

Also, the UE may notify the base station of a value of maxDRS-csi-RS-ConfigId through specific capability signaling. Therefore, the UE may limit complexity of DRS detection to a specific level or less, and the base station may signal DRS-CSI-RS configuration for each ID within the range that does not exceed the value of maxDRS-csi-RS-ConfigId. That is, the UE may not expect that the DRS-CSI-RS configuration for each of the number of IDs, which exceeds the value of maxDRS-csi-RS-ConfigId, is signaled.

(B) The number of DRS antenna ports common for each ID is limited to each ID in the form of antennaPortsCount-r1x. In other words, a small cell which desires to transmit a DRS dependent upon a configuration of a corresponding ID should transmit a DRS to the number of antenna ports indicated by antennaPortsCount-r1x, and the UE tries to detect the DRS having such antenna ports.

(C) A scheme that designates a resource position of the DRS-CSI-RS in the form of resourceConfigList-r1x may be configured in the form (for example, bitmap type of legacy resourceConfigList-r11), which expresses a set of positions to which the DRS-CSI-RS can be transmitted, without depending on single resourceConfig-r11 indicated by one of integers (0 . . . 31) like the legacy NZP CSI-RS configuration.

Preferably, the above resourceConfigList-r1x may be configured to include at least one of DRS-CSI-RS equivalent to the number of antenna ports antennaPortsCount-r1x. The UE tries to detect a specific DRS-CSI-RS corresponding to the antenna ports antennaPortsCount-r1x within the resourceConfigList-r1x.

Also, the resourceConfigList-r1x may be indicated additionally or separately by information which is useful for a specific RB only. For example, the resourceConfigList-r1x may be restricted to indicate some RBs (for example, half odd RBs or RB indexes #k to #(k+d) or specific RB index sets {k1, k2, . . . }) of a total of 50 RBs in the system to which the total of 50 RBs are allocated.

(D) DRS transmission subframe information common for the specific ID is limited to the specific ID in the form of subframeConfig-r1x. In other words, a small cell which desires to transmit a DRS dependent upon a configuration of a corresponding ID may transmit (or should transmit) a DRS at a subframe corresponding to subframeConfig-r1x, and the UE tries to detect the DRS at the subframe.

The subframeConfig-r1x may indicate a specific subframe burst unlike the legacy case. For example, DRS transmission resources may be indicated for N continuous subframes by starting from a subframe indicated by the subframeConfig-r1x, or the subframeConfig-r1x may indicate corresponding subframes in the form of subframe bitmap type of a specific unit (for example, 40 ms, or 80 ms, . . . ) unlike the legacy case indicating a specific cycle and offset value.

Preferably, the subframe indicated by the subframeConfig-r1x in this way is basically calculated based on a system frame number (SFN) value acquired from a serving cell to which the UE is connected. For example, if the serving cell of the UE is operated at a component carrier (CC) #1 of which center frequency is f1 and the DRS configuration is intended for CC2 of which center frequency is f2, it may correspond to a case that small cells within a small cell cluster of CC2 synchronize with and depend on the SFN value on which the serving cell of CC1 depends. Alternatively, if the SFN value of CC1 is different from that of CC2 as much as a delta value and a network knows the difference, information corresponding to the delta value may be notified to the UE through the DRS configuration or separate signaling, whereby the UE may be operated/configured to interpret and apply the subframeConfig-r1x information based on an SFN value obtained by correcting the delta value to the SFN value of the serving cell when interpreting the subframeConfig-r1x information. At this time, the corresponding CC or center frequency may be notified to the UE through the DRS configuration or separate signaling.

Or the information such as the subframeConfig-r1x may be restricted to be provided as periodicity information only. For example, the information may be configured in the form such as periodicity=80 ms, and a delta value and/or subframe offset value of the SFN, which may indicate a starting point, may be omitted. This may correspond to a case that the CC1 which is the serving cell indicates the DRS configuration information but does not know a level of time synchronization with the small cells of CC2. In this case, the UE should perform blind detection for the DRS by using only the information of the periodicity (for example, 80 ms). At this time, a restriction that a sequence scrambling initialization parameter of the DRS-CSI-RS transmitted from the small cell is always the same as that of another DRS (for example, DRS-PSS, DRS-SSS, etc.) transmitted from the corresponding small cell may be given. In this case, after the corresponding sequence scrambling initialization parameter is detected by blind detection for another DRS (for example, DRS-PSS, DRS-SS), the DRS-CSI-RS having the same sequence scrambling initialization parameter may be detected.

To this end, a restriction that a transmission timing of the DRS (for example, DRS-PSS, DRS-SSS, etc.) transmitted from the small cell and a transmission timing of the DRS-CSI-RS transmitted from the corresponding small cell will certainly exist between a value of −T[ms] and a value of +T[ms] may be defined/configured for the UE. Therefore, since the UE is assured that another DRS transmission will exist between the value of −T[ms] and the value of +T[ms] based on the DRS which is first detected between the DRS-CSI-RS and another DRS (for example, DRS-PSS, DRS-SSS) transmitted from the specific small cell, the UE performs blind detection and identification/verification of cell ID.

(E) ScramblingIdentityList-r1x may be defined in the form of a set that includes sequence scrambling initialization parameters of the DRS transmitted from the small cell as elements. For example, if a possible range of the sequence scrambling initialization parameters of the DRS corresponds to 0 to K (for example, K=503), the scramblingIdentityList-r1x may be indicated in the form of {207, 53, 448, 6, . . . }, for example. The UE generates DRS-CSI-RS sequences by using elements within the indicated scramblingIdentityList-r1x as the sequence scrambling initialization parameters and then tries to detect them.

Additionally, it is preferable that PDSCH rate matching is always applied to RE positions of resourceConfigList-r1x and subframeConfig-r1x indicated by the DRS-CSI-RS configuration. That is, if the DRS-CSI-RS configuration is signaled, the UE recognizes the DRS-CSI-RS configuration as resource information which should be reflected during RE mapping of a PDSCH which will be received from the serving cell. Therefore, PDSCH rate matching is always applied to resource position information indicated by the DRS-CSI-RS configuration even though resource position of the DRS-CSI-RS is not included in specific ZP CSI-RS configuration information which is provided separately.

Meanwhile, if the UE successfully detects the DRS, which is transmitted from a specific small cell, in accordance with the DRS-CSI-RS configuration, the UE may be defined/configured to first transmit a DRS (for example, DRS-PSS, DRS-SSS, or DRS-CSI-RS) of the specific small cell prior to legacy various reference signals (for example, PSS, SSS, CRS, CSI-RS, PRS, and DMRS) even though the UE may directly detect the legacy reference signals transmitted from the corresponding small cell in on-state and it is recognized that collision between the DRS of the corresponding small cell and the legacy various reference signals occurs, and at this time, the UE may be defined/configured to always assume that the legacy reference signal recognized as the occurrence of collision is not transmitted.

For example, if the UE successfully detects the DRS-CSI-RS, which is transmitted from a specific small cell A (for example, if a sequence scrambling initialization parameter of a corresponding DRS-CSI-RS among scramblingIdentityList-r1x indicated through the DRS-CSI-RS configuration is detected as N_ID_A), PCI (physical cell-ID) of the corresponding small cell A may be configured as N_ID_A, and when the corresponding small cell A is in on-state, the UE may detect the legacy PSS/SSS, CRS, etc. which are transmitted from the small cell A by using the corresponding PCI=N_ID_A.

i) At this time, if the legacy PSS and/or SSS, which is transmitted from the small cell A, is overlapped with the DRS-CSI-RS transmitted from the corresponding small cell A and at least one RE at a specific time, the corresponding small cell A drops the legacy PSS and/or SSS (at the corresponding subframe), and transmits the DRS-CSI-RS. As described above, collision may occur due to various statuses. For example, the SFN or delta value notified from the serving cell of the corresponding UE to the corresponding UE through RRC signaling may be mismatched with the actual operation of the small cell A, whereby collision may occur. Or the small cell A may intentionally configure performance deterioration of the legacy reference signal to generate collision due to a relatively long transmission cycle of the DRS-CSI-RS. In other words, if the legacy PSS/SSS is transmitted at a cycle of 5 ms, even though transmission of the legacy PSS/SSS is omitted at the transmission timing of the DRS-CSI-RS transmitted at a relatively long transmission cycle, it may be determined not to affect performance of the legacy PSS/SSS. Likewise, even in the case that the number of UEs is not great, it may be determined not to affect performance of the legacy PSS/SSS. For these reasons, the UE of the present invention, which supports the DRS related operation, may be defined/configured to regard that there is no transmission of the legacy PSS/SSS during collision between the DRS-CSI-RS and the legacy PSS/SSS and detect the DRS-CSI-RS as transmission of the DRS-CSI-RS is always prior to transmission of the PSS/SSS.

ii) If the legacy CRS transmitted from the small cell A is overlapped with the DRS-CSI-RS transmitted from the same small cell A and at least one RE at a specific time, the corresponding small cell A drops the legacy CRS (at the corresponding subframe or the OFDM symbol where collision occurs), and transmits the DRS-CSI-RS.

Preferably, since the legacy UEs may measure the CRS over a plurality of subframes and take an average value of the measured CRS, the corresponding small cell A may be configured to avoid collision with the legacy CRS through a method for transmitting the DRS-CSI-RS at a (fake) MBSFN subframe. Therefore, it is preferable to allow the collision not to occur. However, in order that the UE does not take an action for additionally determining whether collision occurs, the UE may be defined/configured to regard that there is no transmission of the legacy CRS (at the corresponding subframe or the OFDM symbol where collision occurs) during collision between the DRS-CSI-RS and the legacy CRS and detect the DRS-CSI-RS as transmission of the DRS-CSI-RS is always prior to transmission of the CRS.

iii) If the legacy CSI-RS transmitted from the small cell A is overlapped with the DRS-CSI-RS transmitted from the same small cell A and at least one RE at a specific time, the corresponding small cell A drops the legacy CSI-RS (at the corresponding subframe), and transmits the DRS-CSI-RS. This may be a useful operation when the UE is configured to receive the legacy CSI-RS from the small cell A. That is, although the small cell A transmits the legacy CSI-RS only in case of on-state, in order that the UE does not take an action for additionally determining whether collision occurs, the UE may be defined/configured to regard that there is no transmission of the legacy CRS-RS (at the corresponding subframe) during collision between the DRS-CSI-RS and the legacy CSI-RS and detect the DRS-CSI-RS as transmission of the DRS-CSI-RS is always prior to transmission of the CSI-RS.

iv) If the legacy PRS (Positioning Reference Signal) transmitted from the small cell A is overlapped with the DRS-CSI-RS transmitted from the same small cell A and at least one RE at a specific time, the corresponding small cell A drops the legacy PRS (at the corresponding subframe or the OFDM symbol where corresponding collision occurs, or at RE only where corresponding collision occurs), and transmits the DRS-CSI-RS. That is, in order that the UE does not take an action for additionally determining whether collision occurs, the UE may be defined/configured to regard that there is no transmission of the legacy PRS (at the corresponding subframe or the OFDM symbol where corresponding collision occurs, or at RE only where corresponding collision occurs) during collision between the DRS-CSI-RS and the legacy PRS and detect the DRS-CSI-RS as transmission of the DRS-CSI-RS is always prior to transmission of the PRS.

v) If the legacy DM-RS transmitted from the small cell A is overlapped with the DRS-CSI-RS transmitted from the same small cell A and at least one RE at a specific time, the corresponding small cell A drops the legacy DM-RS (at the corresponding subframe or the OFDM symbol where corresponding collision occurs, or at RE only where corresponding collision occurs), and transmits the DRS-CSI-RS. At this time, the DM-RS may be a DM-RS used for PDSCH transmission, or may be a DM-RS used for EPDCCH transmission. That is, in order that the UE does not take an action for additionally determining whether collision occurs, the UE may be defined/configured to regard that there is no transmission of the legacy DM-RS (at the corresponding subframe or the OFDM symbol where corresponding collision occurs, or at RE only where corresponding collision occurs) during collision between the DRS-CSI-RS and the legacy DM-RS and detect the DRS-CSI-RS as transmission of the DRS-CSI-RS is always prior to transmission of the DM-RS.

It will be apparent that spirits of the present invention described based on the example of the DRS-CSI-RS may be applied to DRS-PSS and DRS-SSS, or another type DRS (for example, DRS-CRS, DRS-PRS or another type DRS).

Figure 14:
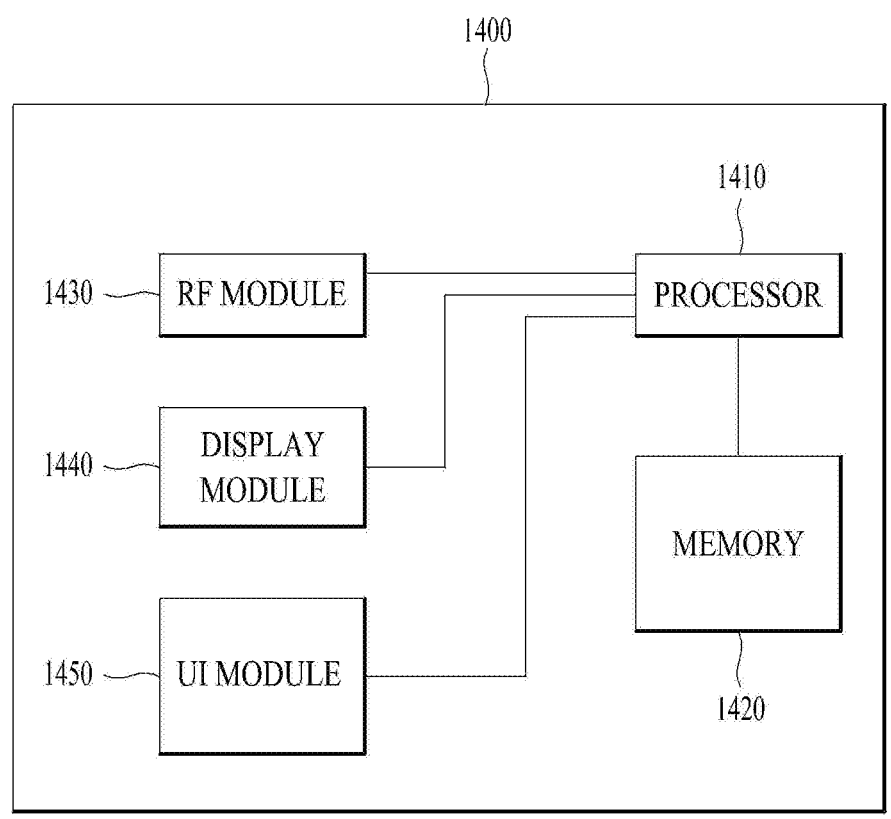
FIG. 14 is a block diagram of a communication apparatus according to an embodiment of the present invention.

FIG. 14 is a block diagram for an example of a communication device according to one embodiment of the present invention.

Referring to FIG. 14, a communication device 1400 may include a processor 1410, a memory 1420, an RF module 1430, a display module 1440, and a user interface module 1450.

Since the communication device 1400 is depicted for clarity of description, prescribed module(s) may be omitted in part. The communication device 1400 may further include necessary module(s). And, a prescribed module of the communication device 1400 may be divided into subdivided modules. A processor 1410 is configured to perform an operation according to the embodiments of the present invention illustrated with reference to drawings. In particular, the detailed operation of the processor 1410 may refer to the former contents described with reference to FIG. 1 to FIG. 13.

The memory 1420 is connected with the processor 1410 and stores an operating system, applications, program codes, data, and the like. The RF module 1430 is connected with the processor 1410 and then performs a function of converting a baseband signal to a radio signal or a function of converting a radio signal to a baseband signal. To this end, the RF module 1430 performs an analog conversion, amplification, a filtering, and a frequency up conversion, or performs processes inverse to the former processes. The display module 1440 is connected with the processor 1410 and displays various kinds of informations. And, the display module 1440 can be implemented using such a well-known component as an LCD (liquid crystal display), an LED (light emitting diode), an OLED (organic light emitting diode) display and the like, by which the present invention may be non-limited. The user interface module 1450 is connected with the processor 1410 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the aforementioned method for receiving a discovery reference signal in a user equipment of a wireless communication system and the device therefor have been described based on the 3GPP LTE system, the method and device may be applied to various wireless communication systems in addition to the 3GPP LTE system.

The invention claimed is:

1. A method for receiving a discovery reference signal in a user equipment of a wireless communication system, the method comprising the steps of:
   receiving discovery reference signal configuration information through an upper layer;
   blind-detecting at least one discovery reference signal on the basis of the configuration information; and
   transmitting and receiving a signal to and from a small cell corresponding to the detected at least one discovery signal and a serving cell,
   wherein the discovery reference signal configuration information includes information on a candidate parameter set of the discovery reference signal,
   wherein the candidate parameter set includes one antenna port index for blind detection of the discovery reference signal and frequency resource position information that may be detected by the discovery reference signal, and
   wherein the frequency resource position information is expressed by a set of various kinds of resource position information corresponding to the antenna port index.

2. The method according to claim 1, wherein the candidate parameter set includes, time resource position information that may be detected by the discovery reference signal, and a set of scrambling sequence initial values for blind detection of the discovery reference signal.

3. The method according to claim 2, wherein the discovery reference signal is continuously transmitted from the small cell for a specific time resource to a plurality of time resources, and the time resource position information includes information on the specific time resource and information on the plurality of time resources.

4. The method according to claim 3, wherein the information on the specific time resource indicates an offset value with a system frame number of the serving cell.

5. The method according to claim 2, wherein the step of blind-detecting at least one discovery reference signal includes blind-detecting the discovery reference signal on the assumption that there is no legacy reference signal in a resource where the discovery reference signal is blind-detected.

6. The method according to claim 1, wherein the step of transmitting and receiving a signal includes acquiring time/frequency synchronization with the small cell on the basis of the discovery reference signal.

7. A user equipment in a wireless communication system, the user equipment comprising:
   a wireless communication module for transmitting and receiving a signal to and from a network; and
   a processor for processing the signal,
   wherein the processor:
   blind-detects at least one discovery reference signal on the basis of discovery reference signal configuration information provided through an upper layer, and
   controls the wireless communication module to transmit and receive a signal to and from a small cell corresponding to the detected at least one discovery signal and a serving cell, and
   wherein the discovery reference signal configuration information includes information on a candidate parameter set of the discovery reference signal,
   wherein the candidate parameter set includes one antenna port index for blind detection of the discovery reference signal and frequency resource position information that may be detected by the discovery reference signal, and
   wherein the frequency resource position information is expressed by a set of various kinds of resource position information corresponding to the antenna port index.

8. The user equipment according to claim 7, wherein the candidate parameter set includes time resource position information that may be detected by the discovery reference signal, and a set of scrambling sequence initial values for blind detection of the discovery reference signal.

9. The user equipment according to claim 8, wherein the discovery reference signal is continuously transmitted from the small cell for a specific time resource to a plurality of time resources, and the time resource position information includes information on the specific time resource and information on the plurality of time resources.

10. The user equipment according to claim 9, wherein the information on the specific time resource indicates an offset value with a system frame number of the serving cell.

11. The user equipment according to claim 8, wherein the processor blind-detects the discovery reference signal on the assumption that there is no legacy reference signal in a resource where the discovery reference signal is blind-detected.

12. The user equipment according to claim 7, wherein the processor acquires time/frequency synchronization with the small cell on the basis of the discovery reference signal.

* * * * *